United States Patent [19]
Anderson

[11] Patent Number: 4,893,964
[45] Date of Patent: Jan. 16, 1990

[54] INTERLOCKING STRUCTURAL MEMBERS UTILIZING OVERLYING COMPOSITE STRIPS

[75] Inventor: Robert E. Anderson, Huntington Station, N.Y.

[73] Assignee: Grumman Aerospace Corporation, Bethpage, N.Y.

[21] Appl. No.: 306,179

[22] Filed: Feb. 6, 1989

[51] Int. Cl.$^4$ ................................................. F16B 1/00
[52] U.S. Cl. .................................... 403/376; 244/123; 29/513; 403/274; 403/282
[58] Field of Search ..................... 403/256, 254, 409.1, 403/374, 252, 242, 279, 274, 282, 376, 264; 244/132, 123; 29/513

[56] References Cited

U.S. PATENT DOCUMENTS

| | | | |
|---|---|---|---|
| 251,094 | 12/1881 | Carr | 403/256 |
| 254,842 | 3/1882 | Pflug | 403/282 |
| 2,375,951 | 5/1945 | Simon | 244/132 |
| 3,995,080 | 11/1976 | Cogburn et al. | 244/123 |
| 4,331,495 | 5/1982 | Lackman et al. | 244/132 |
| 4,395,450 | 7/1983 | Whitener | 244/123 |
| 4,786,343 | 11/1988 | Hertzberg | 244/123 |
| 4,811,450 | 3/1989 | Kallies et al. | 244/123 |

Primary Examiner—Andrew V. Kundrat
Assistant Examiner—Carol I. Bordas
Attorney, Agent, or Firm—Pollock, Vande Sande & Priddy

[57] ABSTRACT

A wing skin is usually mounted to a support structure by using metal fasteners which cause high stress points and potential leakage points. The invention utilizes a wing skin structure fabricated from fabric strips with projections formed in the wing skin to mate with recesses formed in a support substructure thus forming interdigitations which prevent sliding displacement of the wing skin. A sliding bar passes through the interdigitating sections to maintain an interlocking relation.

13 Claims, 3 Drawing Sheets

4,893,964

INTERLOCKING STRUCTURAL MEMBERS UTILIZING OVERLYING COMPOSITE STRIPS

FIELD OF THE INVENTION

The present invention relates to a fastenerless joint, and more particularly to such a joint for composite aircraft structures.

BRIEF DESCRIPTION OF THE PRIOR ART

In many fabrication applications laminated structures are attached to support structures by common fastening techniques. In one particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are often contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes mechanically interleaved plies of a composite laminate wing skin structure which enforces the normal bonding between plies of the laminate.

Alternating projections are formed from the wing skin laminate and these receive mating recesses in a composite wing substructure so that interdigitation of the wing skin structure and support substructure results. The interdigitating members are hollow so that an elongated bar, which may be fabricated from the composite laminate, may be slid therethrough thereby locking the members together.

The result is securement between the wing skin structure and support substructure without the need for discrete metallic fasteners. By avoiding metal fasteners such as rivets, the previously discussed problems of high shear stress and leakage can be eliminated.

The interleaved plies of the composite laminate wing structure are made up of orthogonally oriented strips so that a wing skin structure of uniform thickness is obtained.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in co with the accompanying drawings, in which.

DETAILED DESCRIPTION OF THE INVENTION

Figure 1:
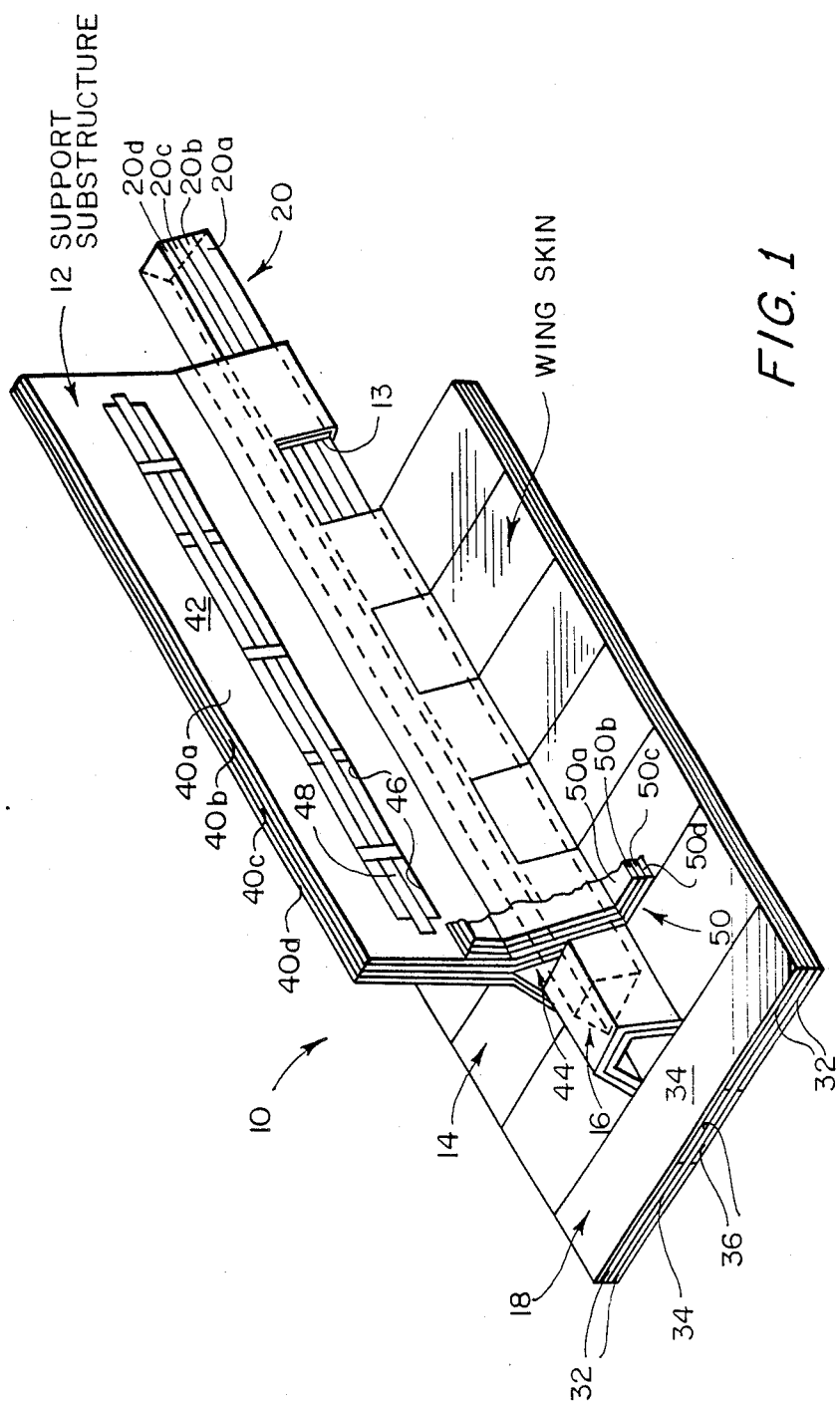
FIG. 1 is a perspective view illustrating interlocking engagement between a wing skin structure and support structure in accordance with the present invention.

Reference is made to FIG. 1 wherein interlocking engagement between a wing skin structure and support substructure is illustrated. The interlocking members are generally indicated by reference numeral 10 and are seen to include a wing support substructure 12 secured to a wing skin structure 14. In order to achieve the interlocking engagement between members 12 and 14, trapezoidal projections 16 are formed in the wing skin structure 14 at longitudinally spaced intervals. The wing support substructure 12 has, along a triangular base portion, slots 13 formed therein—along similarly spaced intervals. The slots 13 receive corresponding trapezoidal projections 16 so that the engaging portions form interdigitations. The triangular base portion of the substructure 12 and the trapezoidal projections 16 are hollowed so that a bar 20 can slide therethrough to secure interlocking engagement between the substructure 12 and the projections 16.

It is to be noted that the wing support substructure 12 is shown mounted in longitudinal offset relationship with the wing skin substructure 14 so that details of the invention are better illustrated. In actual utilization of the invention, the substructure 12 would be shifted to more completely overlie the skin structure 14.

Figure 2:
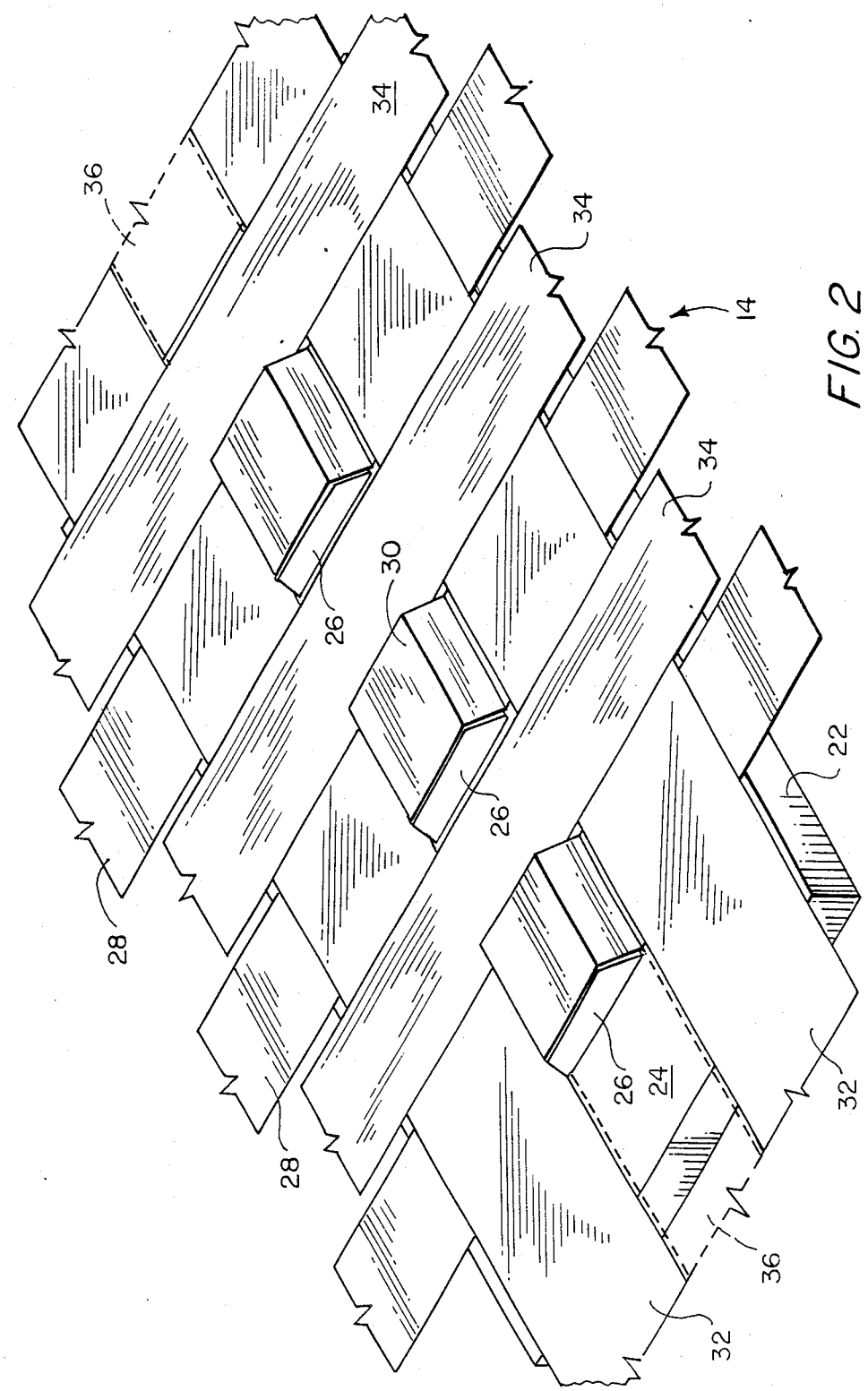
FIG. 2 a perspective view illustrating the sequence of plies which constitute the wing skin structure of the present invention.

In order to better appreciate the construction of the present invention, reference is made to FIG. 2 wherein the various sequences of applied plies are indicated. The plies or layers may be fabricated from Fiberglas or other suitable composite material. As is the case in existing composite aircraft laminated structures, the individual plies may be impregnated with resin and then cured. Conventional pre-impregnated resins may be successfully used in accordance with known practices.

FIG. 2 indicates a support bed 22 upon which the various plies may be deposited to form the resulting wing skin structure. The bed 22 includes a number of linearly spaced integrally formed trapezoidal members 26 which will form corresponding trapezoidal projections in the wing skin structure. More particularly, a number of parallel spaced fabric strips 28 are deposited upon the surface 24 of bed 22, each of the strips 28 passing across and conforming to the shape of trapezoidal member 26. The deposit of the various parallel-oriented strips 28 comprises a bottom ply for the resulting wing skin structure shown in FIG. 3. A second ply is fabricated by depositing parallel spaced fabric strips 32 perpendicularly to the strips 28 of the first ply. Further, the strips 32 are located at opposite edges of the trapezoidal projections 30 located along the midsection of corresponding strips 28. A top ply for the elementary laminated structure shown in FIG. 2 is further comprised of a plurality of parallel spaced fabric strips 34 which are positioned in between the strips 28. If the finished skin thickness is to be uniform, spacer fabric strips 36 are inserted between strips 32, broken longitudinally by the presence of members 26.

Figure 3:
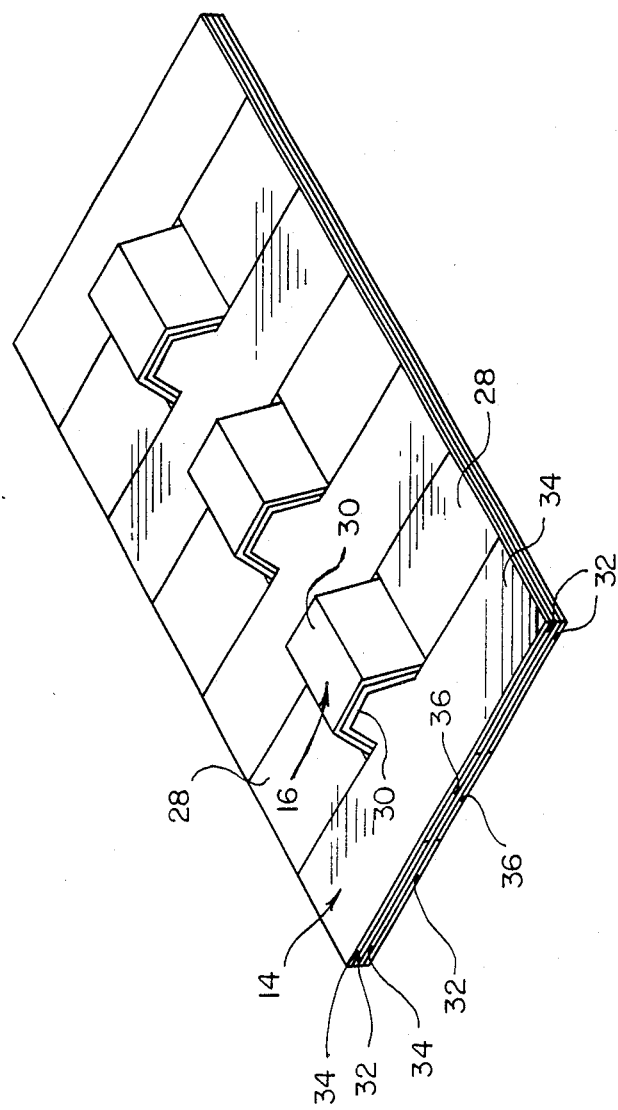
FIG. 3 is a perspective view illustrating the finished appearance of the wing skin structure.

After the resin-impregnated strips of the individual plies are cured, the resulting laminated structure may be removed from bed 22 and a wing structure resembling that of FIG. 3 results.

In FIG. 3 the Wing skin structure would result from a twice-repeated sequence of three plies, as explained in connection with FIG. 2. Therefore, two sets of strips 28, 32 and 34 are present in the finished wing skin structure of FIG. 3. The wing structure may be further rigidified and strengthened by the use of additional repetitive sequences of these plies.

The final construction of the invention will now be explained in connection with FIG. 1. The finished wing skin structure 14 is the same structure as that of FIG. 3, just discussed. The wing support substructure 12 is shown as fabricated from two plies of resin-impregnated fabric, which are folded over one another to form the flat portion 42. The illustrated layers 40a-40d make up the flat portion 42 and it should be understood that layers 40a and 40d are opposite ends of the same single ply while layers 40b and 40c are opposite ends of the same second ply. A lower portion of the wing support structure is formed in a closed hollowed triangular portion generally indicated by reference numeral 44.

By positioning the trapezoidal cross section slots 13 in interdigital relation with the trapezoidal projections 16, the wing support substructure 12 may be longitudinally fixed. However, in order to fasten the wing skin structure 14 and wing support substructure 12 together, the slidable bar 20 is longitudinally passed through the opening in the triangular portion 44 and the opening in the spaced trapezoidal projections 16 rising above the surface of the wing skin structure 14. The bar 20 is preferably made from resin-impregnated Fiberglass or other suitable composite fabric laminate (20a-20d), as is the case with the wing skin structure 14 and support substructure 12. After the bar is slid completely through the support substructure 12, mechanical secured interlocking therebetween is achieved.

In order to fabricate the composite wing skin structure and composite wing support substructure as rigid load-supportable members, the resin impregnation of the composite fabrics must be cured. In this regard the wing skin structure 14 may be cured separately from the support substructure 12 and then assembled. Alternatively, the wing skin structure 14 may be connected to the support substructure 12 while both are still wet. Then, they may be co-cured while a mandrel (not shown) is located within the recess that bar 20 occupies in FIG. 1. After co-curing the mandrel may be removed; and bar 20, separately cured, is passed through the substructure 12 and trapezoidal projection 16.

In order to increase the substructure's resistance to shear forces, the individual layers 40a-40d may be laced together. This is simply achieved by forming rectangular spaced slots 46 longitudinally along the flat portion 42 of the substructure 12. Then, a strip of fabric laminate 48 may be threaded through the slots 46 thereby passing through all of the layers 40a-40d in interleaved securement thereof. The strip 48 is preferably threaded through slots 46 and then cured with the substructure 12.

In a finally assembled aircraft, the wing support substructure 12 and trapezoidal projections 16 are positioned internally of the wing. The underside of the wing skin structure 14, opposite the surface 18 illustrated, will form the exterior surface of the wing skin.

Although the invention thus far described is resistive to longitudinal loads, it will be appreciated that the disposition of wing support substructure 12 forms somewhat of a hinge connection with the wing skin structure 14. In order to resist rotational displacement of the wing skin structure 14 relative to substructure 12, additional reinforcement means is preferred. A web reinforcement means is generally indicated in FIG. 1 by strip 50. As will be seen, a laminated fabric composite is employed. For illustrative purposes, the reinforcement strip includes four plies 50a-50d. The strip is positioned longitudinally along the wing support substructure 12 so that it intimately contacts the surface of the flat portion 42 and the triangular portion 44. Also, the bottom of the reinforcing strip 50 is attached to the upper surface of wing skin structure 14. The strip, being impregnated with resin or the like, is attached to structures 12 and 14 to resist rotational displacement of the wing support substructure 12. Although a single strip 50 is shown on the near side of substructure 12 and wing skin structure 14, this has been done to simplify the view; and in fact, a second identical strip is located on the far side of structures 12 and 14.

Although the present invention has been explained in connection with trapezoidal projection 16 and a triangular-based wing support substructure 12, this has been done to simplify the explanation and is only illustrative. Other mating shapes may be similarly employed.

As will be appreciated, by virtue of the connection of wing skin structure 14 to wing support substructure 12, without the aid of rivets, high stress points and leakage points between the two structures are eliminated.

Although the present invention has been described in terms of a fastenerless joint for securing an aircraft wing skin to a support structure, it should be appreciated that the invention contemplates other applications. Thus, the following claims envision general utilization of projections from a first laminated structure to form interdigitations with a support substructure to achieve a secure joint therebetween. For example, the present invention is envisioned for applications directed to securing other aircraft skin sections to support substructures, in addition to a wing skin as discussed herein.

It should be understood that the invention is not limited to the exact details of construction shown and described herein, for obvious modifications will occur to persons skilled in the art.

I claim:

1. An integrally formed joint for interlocking first and second structural members, the joint comprising:
    a) a first structural laminate member including
        i) at least one bottom ply having a plurality of spaced parallel strips each of which is raised at an intermediate point to form a projection;
        ii) at least one middle ply having a plurality of parallel spaced strips located perpendicular to the strips of the first ply and positioned laterally of the projections;
        iii) at least one top ply having a plurality of parallel spaced strips, each strip being respectively parallel and adjacent to a strip of the bottom ply;
    b) a second structural member including an elongated base portion having an open cross section and spaced recesses therealong which receive corresponding projections of the first member thereby forming interdigital engagement therebetween; and
    c) an elongated bar received within the interdigitating projections and the base portion for securing engagement of the first and second structural members.

2. The structure set forth in claim 1 wherein the first structural member is formed from a plurality of repetitively sequenced bonded plies.

3. The structure set forth in claim 1 wherein the second structural member is a laminate fabricated from a plurality of bonded layers.

4. The structure set forth in claim 1 wherein the second structural member is a laminate fabricated from a plurality of bonded layers; and further wherein
   means are laced through a portion of the second structural member which extends from the base portion thereby increasing the shear strength of the bonded layers of the second member.

5. The structure set forth in claim 1 together with reinforcing strips attached between the base portion of the second structural member and the top ply of the first structural member.

6. The structure set forth in claim 1 together with spacer strips located between adjacent strips of the middle ply for effecting a resultant first member of uniform thickness throughout its continuous surface.

7. An integrally formed joint for interlocking first and second structural members comprising:
   a) a first structural laminate member having a plurality of alternating bonded sequences of first, second and third plies, the member more particularly including
      i) first plies each having a plurality of spaced parallel strips wherein each strip is raised at an intermediate point to form a projection;
      ii) second plies each having a plurality of parallel spaced strips located perpendicular to the strips of the first ply;
      iii) third plies each having a plurality of parallel spaced strips, each strip being respectively parallel and adjacent to a strip of the first ply;
   b) a second structural laminate member having a plurality of bonded plies and including an elongated base portion having an open cross section and spaced recesses therealong which receive corresponding overlying projections of the first member thereby forming interdigital engagement therebetween; and
   c) an elongated laminate bar formed from a plurality of bonded plies and received within the interdigitating projections and base portion for securing engagement of the first and second structural members.

8. The structure set forth in claim 7 wherein the second structural member is a laminate fabricated from a plurality of bonded layers; and further wherein
   means are laced through a portion of the second structural member which extends from the base portion thereby increasing the shear strength of the bonded layers.

9. The structure set forth in claim 7 together with reinforcing strips attached between the base portion of the second structural member and the top ply of the first structural member.

10. The structure set forth in claim 7 together with spacer strips located between adjacent strips of the middle ply for effecting a resultant first member of uniform thickness throughout its continuous surface.

11. The method of integrally forming a joint which interlocks first and second structural members, the method comprising the steps:
    a) arranging parallel strips of material to form a first ply of a first structural member, each ply having a raised portion at an intermediate point to form a projection;
    b) positioning a plurality of parallel spaced strips to form a second ply, wherein the latter strips are oriented perpendicular to the strips of the first ply;
    c) positioning a plurality of parallel spaced strips to form a third ply, wherein the latter strips are each located respectively parallel and adjacent to a strip of the first ply;
    d) alternately positioning, for at least one sequence, the first, second and third plies to form a laminated first structural member wherein the projections of the first plies become stacked and pass through correspondingly aligned openings in the second and third plies;
    e) forming a second structural laminate member to include an elongated base portion having an open cross section and spaced recesses therealong;
    f) positioning the second structural member in engagement with the first structural member wherein the recesses of the second structural member receive corresponding projections of the first member and interdigitation results therebetween; and
    g) passing an elongated bar through the base portion and projections to secure the members together.

12. The method set forth in claim 11 wherein the bar is fabricated as a laminate.

13. The method set forth in claim 11 together with the step of positioning spacer strips between adjacent strips of the second ply to effect a first structural member of uniform thickness throughout its continuous surface.

* * * * *

UNITED STATES PATENT AND TRADEMARK OFFICE
CERTIFICATE OF CORRECTION

PATENT NO. : 4,893,964
DATED : January 16, 1990
INVENTOR(S) : Robert E. Anderson It is certified that error appears in the above-identified patent and that said Letters Patent is hereby corrected as shown below:

Column 1, line 67, change "co" to --conjunction--.

Column 2, line 40, change "Fiberglas" to --Fiberglass--.

Column 2, line 33, change "substructure 14" to

--structure 14--.

Column 3, line 5, change "Wing" to --wing--.

Signed and Sealed this

Twelfth Day of March, 1991

Attest:

HARRY F. MANBECK, JR.

Attesting Officer

Commissioner of Patents and Trademarks